(12) United States Patent
Xu et al.

(10) Patent No.: US 10,325,730 B2
(45) Date of Patent: Jun. 18, 2019

(54) HIGH PERFORMANCE LAYERED CATHODE MATERIALS FOR HIGH VOLTAGE SODIUM-ION BATTERIES

(71) Applicant: UChicago Argonne, LLC, Chicago, IL (US)

(72) Inventors: Gui-Liang Xu, Downers Grove, IL (US); Zonghai Chen, Bolingbrook, IL (US); Khalil Amine, Oakbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 202 days.

(21) Appl. No.: 15/280,753

(22) Filed: Sep. 29, 2016

(65) Prior Publication Data

US 2018/0090758 A1    Mar. 29, 2018

(51) Int. Cl.
| H01M 4/52 | (2010.01) |
| H01G 11/26 | (2013.01) |
| H01M 4/525 | (2010.01) |
| H01M 10/054 | (2010.01) |
| H01M 4/505 | (2010.01) |
| H01G 11/24 | (2013.01) |
| H01M 4/485 | (2010.01) |
| H01M 4/58 | (2010.01) |
| H01M 4/36 | (2006.01) |
| H01M 4/02 | (2006.01) |

(52) U.S. Cl.
CPC .............. *H01G 11/26* (2013.01); *H01G 11/24* (2013.01); *H01M 4/485* (2013.01); *H01M 4/505* (2013.01); *H01M 4/525* (2013.01); *H01M 4/5825* (2013.01); *H01M 10/054* (2013.01); *H01M 4/366* (2013.01); *H01M 2004/028* (2013.01)

(58) Field of Classification Search
CPC ........ H01M 4/505; H01M 4/52; H01M 4/525; H01M 4/366; H01M 2004/028
USPC ................................ 429/223, 217, 224, 131
See application file for complete search history.

(56) References Cited

U.S. PATENT DOCUMENTS

| 8,535,832 B2 * | 9/2013 | Karthikeyan ......... | H01M 4/366 252/182.1 |
| 2013/0149609 A1 | 6/2013 | Deng et al. | |
| 2014/0087264 A1 * | 3/2014 | Li ......................... | H01M 4/366 429/224 |

(Continued)

FOREIGN PATENT DOCUMENTS

WO    WO-2016/049014 A1    3/2016

OTHER PUBLICATIONS

Kim et al, Enabling Sodium Batteries Using Lithium-Substituted Sodium Layered Transition Metal Oxide Cathodes:, Advanced Energy Materials, 1, 333-336 (2011). (Year: 2011).*

(Continued)

*Primary Examiner* — Amanda C. Walke
(74) *Attorney, Agent, or Firm* — Foley & Lardner LLP

(57) ABSTRACT

A cathode active material includes $Na_xMO_2$ having at least a first phase, a second phase different from the first phase, and a third phase that is different from the first and second phases, wherein each phase is independently selected from Pm or On, where m and n are individually an integer, M is a transition metal or a mixture of transition metals, and x is greater than 0 and less than or equal to 1.

13 Claims, 10 Drawing Sheets

(56) References Cited

U.S. PATENT DOCUMENTS

| | | | | |
|---|---|---|---|---|
| 2014/0162127 | A1* | 6/2014 | Kim | H01M 4/366 |
| | | | | 429/224 |
| 2015/0064568 | A1* | 3/2015 | Yushin | H01M 10/0525 |
| | | | | 429/233 |
| 2015/0188144 | A1* | 7/2015 | Shin | H01M 4/0402 |
| | | | | 429/212 |
| 2016/0043387 | A1* | 2/2016 | Kalaiselvi | H01M 4/366 |
| | | | | 429/223 |
| 2016/0049653 | A1* | 2/2016 | Obrovac | H01M 4/485 |
| | | | | 429/231.1 |
| 2016/0260965 | A1* | 9/2016 | Wu | H01M 4/139 |
| 2016/0351973 | A1* | 12/2016 | Albano | H01M 4/366 |
| 2017/0317350 | A1* | 11/2017 | Ceder | H01M 4/525 |
| 2018/0034054 | A1* | 2/2018 | Chan | H01M 4/525 |
| 2018/0190987 | A1* | 7/2018 | Tarascon | B22F 9/04 |
| 2018/0190990 | A1* | 7/2018 | Tarascon | H01M 4/04 |

OTHER PUBLICATIONS

Billaud et al., $Na_{0.67}Mn_{1-x}Mg_xO_2 (0 \leq x \leq 0.2)$: a high capacity cathode for sodium-ion batteries, Energy Environmental Science, No. 7, Feb. 21, 2014, 5 pages.

Buchholz et al., Toward Na-ion Batteries-Synthesis and Characterization of a Novel High Capacity Na Ion Intercalation Material, Chemistry of Materials, vol. 25, No. 2, Jan. 22, 2013 (first published online Dec. 17, 2012), 7 pages.

Buchholz et al., Water sensitivity of layered P2/P3-$Na_xNi_{0.22}Co_{0.11}Mn_{0.66}O_2$ cathode material, Journal of Materials Chemistry A, No. 2, Jun. 25, 2014, 7 pages.

Chagas et al., P-type $Na_xNi_{0.22}Co_{0.11}Mn_{0.66}O_2$ materials: linking synthesis with structure and electrochemical performance, Journals of Materials Chemistry A, No. 2, Oct. 31, 2014, 8 pages.

Chen et al., Stable layered P3/P2 $Na_{0.66}Co_{0.5}Mn_{0.5}O_2$ cathode materials for sodium-ion batteries, Journals of Materials Chemistry A, No. 3, Sep. 3, 2015, 7 pages.

Chen et al., Study of Thermal Decomposition of $Li_{1-x}(Ni_{1/3}Mn_{1/3}Co_{1/3})0.9O_2$ Using In-Situ High-Energy X-Ray Diffraction, Advanced Energy Materials, vol. 3, No. 6, Jun. 2013 (first published online Mar. 11, 2013), 8 pages.

Delmas et al., Structural Classification and Properties of the Layered Oxides, Physica 99B, Jan. 1980, 5 pages.

Guo et al., A Layered P2- and O3-Type Composite as a High-Energy Cathode for Rechargeable Sodium-Ion Batteries, Angewandte Communications International Edition, vol. 54, No. 20, May 11, 2015 (first published online Apr. 1, 2015), 6 pages.

Han et al., A comprehensive review of sodium layered oxides: powerful cathodes for Na-ion batteries, Energy & Environmental Science, No. 8, 2015 (first published online Nov. 18, 2014), 22 pages.

Han et al., High-Performance P2-Phase $Na_{frax;2;3}Mn_{0.8}Fe_{0.1}Ti_{0.1}O_2$ Cathode Material for Ambient-Temperature Sodium-Ion Batteries, Chemistry of Materials, vol. 28, No. 1, Jan. 12, 2016 (first published online Nov. 25, 2015), 11 pages.

Hasa et al., High Performance $Na_{0.5}[Ni_{0.23}Fe_{0.13}Mn_{0.63}]O_2$ Cathode for Sodium-Ion Batteries, Advanced Energy Materials, vol. 4, No. 15, Oct. 28, 2014 (first published online Jun. 10, 2014), 7 pages.

Hwang et al., Radially aligned hierarchical columnar structure as a cathode material for high energy density sodium-ion batteries, Natural Communications, No. 6, Article No. 6865, Apr. 17, 2015, 9 pages.

Jung et al., In Situ X-Ray Diffraction Studies on Structural Changes of a P2 Layered Material during Electrochemical Desodiation/Sodiation, Advanced Functional Materials, vol. 25, No. 21, Jun. 3, 2015 (first published online Apr. 15, 2015), 11 pages.

Kang et al., Copper substituted P2-type $Na_{0.67}Cu_xMn_{1-x}O_2$: a stable high-power sodium-ion battery cathode, Journal of Materials Chemistry A, No. 3, Oct. 15, 2015, 7 pages.

Keller et al., Layered Na-Ion Cathodes with Outstanding Performance Resulting from the Synergetic Effect of Mixed P- and O-Type Phases, Advanced Energy Materials, vol. 6, No. 3, Feb. 4, 2016 (first published online Nov. 30, 2015), 11 pages.

Komaba et al., Study on the Reversible Electrode Reaction of $Na_{1-x}Ni_{0.5}Mn_{0.5}O_2$ for a Rechargeable Sodium-Ion Battery, Inorganic Chemistry, vol. 51, No. 11, May 24, 2012, 10 pages.

Lee et al., Layered P2/O3 Intergrowth Cathode: Toward High Power Na-Ion Batteries, Advanced Energy Materials, vol. 4, No. 17, Dec. 9, 2014 (first published online Jul. 24, 2014), 8 pages.

Lin et al., Probing Thermally Induced Decomposition of Delithiated $Li_{1.2-x}Ni_{0.15}Mn_{0.55}Co_{0.1}O_2$ by in Situ High-Energy X-ray Diffraction, ACS Applied Materials & Interfaces, vol. 6, No. 15, Aug. 13, 2014 (first published online Jun. 30, 2014), 6 pages.

Liu et al., A new O3-type layered oxide cathode with high energy/power density for rechargeable Na batteries, Chemical Communications, No. 51, Feb. 9, 2015, 4 pages.

Liu et al., High-Performance P2-Type $Na_{frax;2;3}(Mn_{frax;1;2}Fe_{frax;1;4}Co_{frax;1;4})O_2$ Cathode Material with Superior Rate Capability for Na-Ion Batteries, Advanced Energy Materials, vol. 5, No. 22, Nov. 18, 2015 (first published online Sep. 22, 2015), 5 pages.

Mortemard De Boisse et al., $O3-Na_xMn_{1/3}Fe_{frax;2;3}O_2$ as a positive electrode material for Na-ion batteries: structural evolutions and redox mechanisms upon Na (de)intercalation, Journal of Materials Chemistry A, No. 3, Apr. 20, 2015, 14 pages.

Mu et al., Prototype Sodium-Ion Batteries Using an Air-Stable and Co/Ni-Free O3-Layered Metal Oxide Cathode, Advanced Materials, vol. 27, No. 43, Nov. 2015 (first published online Oct. 5, 2015), 6 pages.

Oh et al., High Capacity O3-Type $Na[Li_{0.05}(Ni_{0.25}Fe_{0.25}Mn_{0.5})_{0.95}]O_2$ Cathode for Sodium Ion Batteries, Chemistry of Materials, vol. 26, No. 21, Nov. 11, 2014 (first published online Oct. 17, 2014), 7 pages.

Palomares et al., Update on Na-based battery materials. A growing research path, Energy & Environmental Science, No. 6, Jun. 14, 2013, 26 pages.

Pan et al., Room-temperature stationary sodium-ion batteries for large-scale electric energy storage, Energy & Environmental Science, No. 6, Jun. 26, 2013, 23 pages.

Pang et al., Interplay between Electrochemistry and Phase Evolution of the P2-type $Na_x(Fe_{frax;1;2}Mn_{frax;1;2})O_2$ Cathode for Use in Sodium-Ion Batteries, Chemistry of Materials, vol. 27, No. 8, Apr. 28, 2015 (first published online Apr. 10, 2015), 9 pages.

Sathiya et al., Synthesis, Structure, and Electrochemical Properties of the Layered Sodium Insertion Cathode Material: $NaNi_{1/3}Mn_{1/3}Co_{1/3}O_2$, Chemistry of Materials, vol. 24, No. 10, May 22, 2012 (first published online Apr. 17, 2012), 8 pages.

Wang et al., Suppressing the P2-O2 Phase Transition of $Na_{0.67}Mn_{0.67}Ni_{0.33}O_2$ by Magnesium Substitution for Improved Sodium-Ion Batteries, Angewandte Chemie International Edition, vol. 55, No. 26, Jun. 20, 2016 (first published online May 3, 2016), 6 pages.

Wu et al., P2-type $Na_{0.66}Ni_{0.33-x}Zn_xMn_{0.67}O_2$ as new high-voltage cathode materials for sodium-ion batteries, Journal of Power Sources, vol. 281, May 1, 2015 (available online Dec. 20, 2014), 9 pages.

Xu et al., Exploring Li substituted O3-structured layered oxides $NaLi_xNi_{1/3-x}Mn_{1/3-x}Co_{1/3-x}O_2$ (x=0.07, 0.13, and 0.2) as promising cathode materials for rechargeable Na batteries, Electrochemistry Communications, vol. 60, Nov. 2015 (available online Jul. 21, 2015), 4 pages.

Xu et al., Identifying the Critical Role of Li Substitution in $P2-Na_x[Li_yNi_zMn_{1-y-z}]O_2$ (0<x, y, z<1) Intercalation Cathode Materials for High-Energy Na-Ion Batteries, Chemistry of Materials, Vo. 26, No. 2, Jan. 28, 2014 (first published online Jan. 3, 2014), 10 pages.

Yu et al., $NaCrO_2$ cathode for high-rate sodium-ion batteries, Energy & Environmental Science, No. 8, May 13, 2015, 8 pages.

Yuan et al., P2-type $Na_{0.67}Mn_{0.65}Fe_{0.2}Ni_{0.15}O_2$ Cathode Material withHigh-capacity for Sodium-ion Battery, Electrochimica Acta, vol. 116, Jan. 10, 2014 (available online Nov. 11, 2013), 6 pges.

Yuan et al., Pure Single-Crystalline $Na_{1.1}V_3O_{7.9}$ Nanobelts as Superior Cathode Materials for Rechargeable Sodium-Ion Batteries, Advanced Science, vol. 2, No. 3, Mar. 2015 (first published online Feb. 17, 2015), 6 pages.

(56) References Cited

OTHER PUBLICATIONS

Zhao et al., Enhanced electrochemical performance of Ti substituted P2-Na$_{2/3}$Ni$_{1/4}$Mn$_{3/4}$O$_2$ cathode material for sodium ion batteries, Electrochimica Acta, vol. 170, Jul. 10, 2015 (available online Apr. 24, 2015), 11 pages.

\* cited by examiner

HIGH PERFORMANCE LAYERED CATHODE MATERIALS FOR HIGH VOLTAGE SODIUM-ION BATTERIES

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to electroactive materials and batteries containing such electroactive materials, and methods to prepare the electroactive materials and batteries. More specifically, the present technology is related to integrated $Na_xMO_2$ as an electroactive material for a sodium ion battery, which is an integrated structure comprising of at least three distinguishable phases independently selected from P1, P2, P3 up to Pm, and O1, O2, O3 up to On (Pm and On are described vide infra), where $0<x\leq1$, m and n are integers, and M is at least one or more of Fe, Co, Ni, Mn, Cr, V, Cu and Ti.

BACKGROUND

Due to the low cost and wide availability of sodium resources, rechargeable sodium-ion batteries (SIBs) have attracted an increasing interest as an appealing alternative to Li-ion batteries (LIBs) for electric energy storage applications. Indeed, the research and development of SIBs materials, especially cathode materials, has attracted worldwide attention. Among the reported cathode candidates, layered transition metal oxides ($Na_xMO_2$, M=Fe, Co, Ni, Mn, Cr, V, Cu, Ti . . . ) have attracted particular attention due to their potential high capacity and good rate capability. Typically, they are composed of repeating sheets of $MO_6$ layers with Na ions being sandwiched in between the oxide layers. Typical Na layered oxides can be mainly classified into O type (On: e.g. O1, O2, and O3) and P type (Pm: e.g. P1, P2, and P3) phases depending on the surrounding Na environment and the number (m and n) of unique oxide packing layers. The letter indicates the environment where Na is located (O: octahedral; P: prismatic) and the number indicates the number of unique interlayers that are surrounded by different oxide layers. It has been reported that the electrochemical behavior of the material is heavily influenced by the structures of the phase not only because of the amount of Na in the pristine state but also due to the stability of each layer and kinetics affected by the surrounding environment of Na.

Previous research on sodium-based layered oxides have revealed that the O3-type material shows a low reversibility above 4.0 V. See *Inorg. Chem.* 2012, 51(11): 6211-6220. Once subjected to a charge over 4.0 V, the materials degrade considerably with large irreversible capacity loss due to increasing catalytic decomposition of the Na-based electrolytes and sodium-driven structural irreversible changes. The P2 phase was considered to be structurally more stable than the O3 phase, as the O3 phase undergoes a series of slab gliding (where one layer of the material is displaced in order from the adjacent layers) during the sodium extraction process as the strength of the Na—O bond is less than that of the Li—O bond. Because of the large fraction of unoccupied $Na^+$ ions sites, the P2 type materials provide a lower initial sodium reservoir and an initial coulombic efficiency higher than 100%, leading to problems regarding full cell cycling and balancing. Moreover, a recent study showed that the transition from P2 to O2 is also possible if an extensive amount of Na is extracted from the host structure, implying the structural instability of P2 layered oxides at deep charge state. See *Phys. Chem. Chem. Phys.* 2013, 15(9): 3304-3312.

SUMMARY

In one aspect, an integrated cathode active material includes a composition of formula $Na_xMO_2$ having at least a first phase, a second phase different from the first phase, and a third phase that is different from the first and second phases, wherein each phase is independently selected from Pm or On, where m and n are individually an integer, M is a transition metal or a mixture of transition metals, and x is greater than 0 and less than or equal to 1. In some embodiments, m is 1, 2, 3, 4, or 5; and n is 1, 2, 3, 4, or 5. In any of the above embodiments, M may be Fe, Co, Ni, Mn, Cr, V, Cu, Ti, or a combination of any two or more thereof. In any of the above embodiments, M may be a mixture of Co, Ni, and Mn. As used herein with respect to the cathode active material, the term "integrated" is intended to indicate that the material is not simply a mixture of different phases, but rather all the phases are included in the bulk material and are form concurrently during the quenching process as described herein.

In another aspect, a process of preparing the integrated $Na_xMO_2$ is provided. The process includes reacting under solvothermal or co-precipitation condition salts of sodium and M in the presence of a precipitation agent and solvent to form a mixture; calcining the mixture at a first calcination temperature to form a first calcination composition; calcining the calcination composition at a second calcination temperature to form a second calcined composition; and thermally quenching the second calcined composition via rapid cooling to form the $Na_xMO_2$; wherein the integrated $Na_xMO_2$ has at least a first phase, a second phase different from the first phase, and a third phase that is different from the first and second phases; each phase is independently selected from Pm or On; m is an integer; n is an integer; M is a transition metal; and x is greater than 0 and less than or equal to 1. In any embodiments of the process, the salts may be sodium or transition metal salts selected from sulfates, sulfites, chlorates, nitrates, acetates, phosphates, citrates, carbonates and a mixture of any two or more thereof; the precipitation agent may be oxalic cid, sodium hydroxide, ammonium hydroxide, sodium carbonate, ammonium carbonate, ammonium hydrogen carbonate, or a mixture of any two or more thereof; and the solvent may be ethanol, deionized water, acetone, acetonitrile, 1-butanol, 2-butanol, diethylene glycol, ethylene glycol, toluene, 1-propanol, 2-propanol, hexane, cyclohexane, diethyl ether, acetic acid, chlorobenzene, 1,2-dimethoxy-ethane, dimethyl-formamide, dimethyl sulfoxide, tetrahydrofuran, oleic acid, oleic amide, or a mixture of any two or more thereof.

In another aspect, an electrochemical device is provided that includes an anode, a non-aqueous electrolyte, and a cathode; wherein: the cathode includes integrated $Na_xMO_2$ having at least a first phase, a second phase different from the first phase, and a third phase that is different from the first and second phases; each phase is independently selected from Pm or On; m is an integer; n is an integer; M is a transition metal or a mixture of transition metals; and x is greater than 0 and less than or equal to 1. In any of the embodiments of the electrochemical device, it may be a sodium-ion battery.

DETAILED DESCRIPTION

Figure 1:
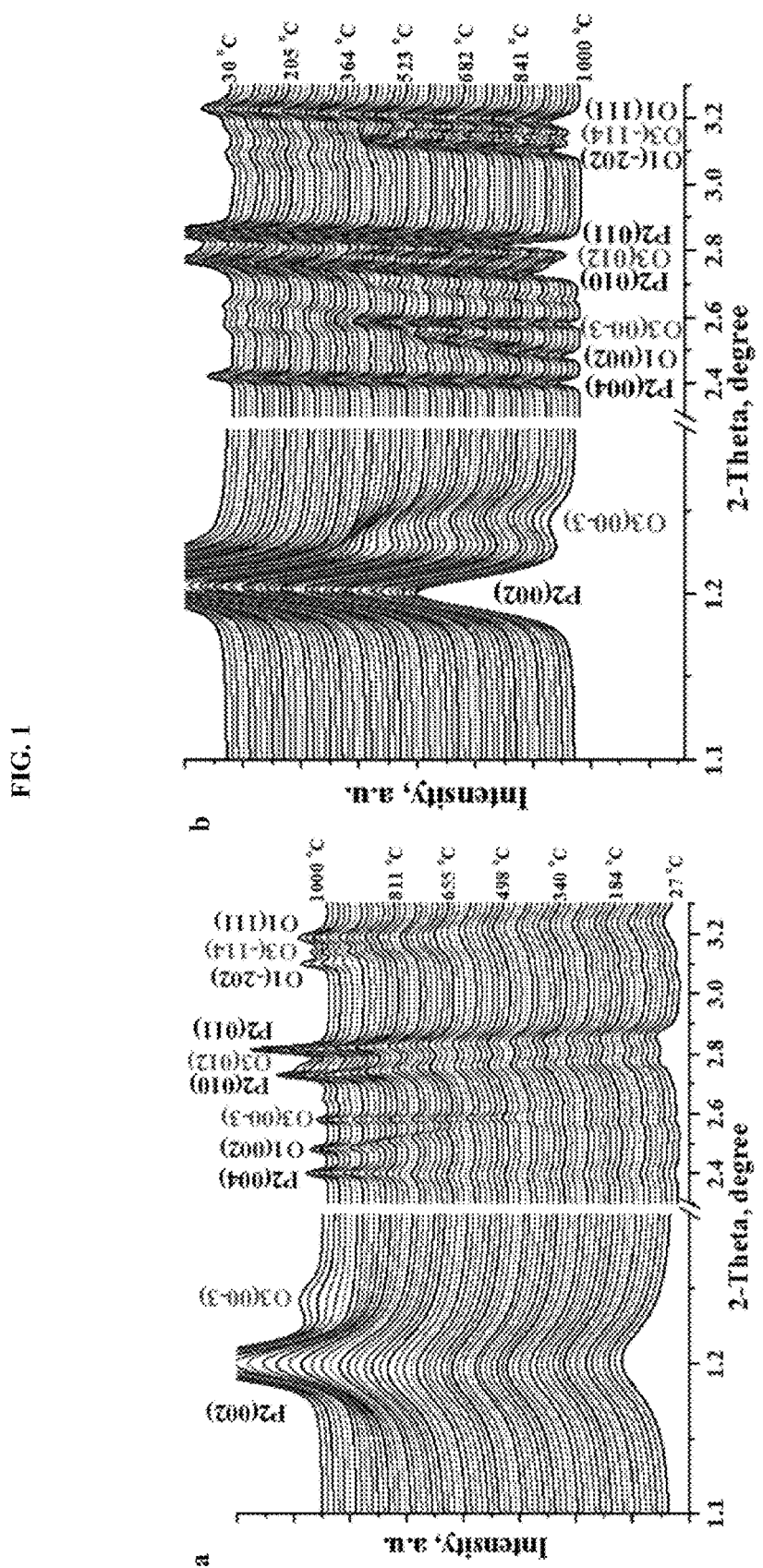
FIG. 1 depicts representative synchrotron in-situ X-ray diffraction patterns of a composition during (a) heating from room temperature to 1000° C. and (b) cooling from 1000° C. to room temperature in air, according to the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Provided herein is an integrated phase material that is based upon a composition of general formula $Na_xMO_2$, where $0<x\leq1$. In the formula, M is a transition metal or a mixture of any two or more transition metals. Due to the method of forming the integrated phase material, at least three distinguishable phases of the same material are present in the bulk material. The phases may be described as a first phase, a second phase that is different from the first phase, and a third phase that is different from the first and second phase. The phases may be classified as octahedral or "O" type (O1, O2, O3 up to On) and prismatic or "P" type (P1, P2, P3 up to Pm) phases depending on the surrounding Na environment and the number of unique oxide packing layers. The letter indicates the environment where Na is located (O: octahedral; P: prismatic) and the number indicates the number of unique interlayers that are surrounded by different oxide layers. The integrated phase material having at least three different phases maintains the three different phases at temperatures below 300° C. Such temperatures include room temperature.

The integrated phase materials may be used as cathode active materials in an electrochemical cell, such as a primary battery, a secondary battery, or a capacitor, where the integrated phase material allows for more efficient insertion/extraction of sodium ions into the bulk materials. The electrochemical cells may include, but are not limited to sodium ion batteries.

In one aspect, materials are provide that include a composition of formula $Na_xMO_2$, where $0<x\leq1$, where M is at least one or more of Fe, Co, Ni, Mn, Cr, V, Cu and Ti, and which has an integrated structure of at least a first phase, a second phase that is different from the first phase, and a third phase that is different from the first and second phases, with each phase being independently selected from Pm or On, where n is an integer. The variables m and n are integers that may individually range in value from 1 to 100. In some embodiments, m and n may be individually an integer from 1 to 5. In some embodiments, Pm is P1, P2, or P3 and On is O1, O2, or O3. In some embodiments, M is a mixture of two or more of Fe, Co, Ni, Mn, Cr, V, Cu and Ti. In some embodiments, M is a mixture of three or more of Fe, Co, Ni, Mn, Cr, V, Cu and Ti. In some embodiments, M comprises a mixture of Co, Ni, and Mn. It is believed that the mixed phase structural integration improves the sodiation/desodiation reversibility during high voltage charge and discharge cycling. The composition of formula $Na_xMO_2$ may be used as a cathode active material, and it may also be used in the cathode of an electrochemical device.

Each individual phase may be present the composition in an amount of about 1 wt % to about 99 wt %, based upon the entire weight of the composition, provided that the total of the individual phases does not exceed 100 wt %. For example, the first phase may be present in the composition from about 1 wt % to about 99 wt %, based upon the entire weight of the composition. This includes an amount of about 10 wt % to about 99 wt %, about 20 wt % to about 99 wt %, about 30 wt % to about 99 wt %, about 40 wt % to about 99 wt %, about 50 wt % to about 99 wt %, about 60 wt % to about 99 wt %, or about 70 wt % to about 99 wt % by the weight ratio. In some embodiments, the first phase is present in an amount of about 1 wt % to about 89 wt % by weight of the composite. This includes an amount of about 10 wt % to about 89 wt %, about 20 wt % to about 89 wt %, about 30 wt % to about 89 wt %, about 40 wt % to about 89 wt %, about 50 wt % to about 89 wt %, or about 60 wt % to about 89 wt % by the weight ratio. In some embodiments, the first phase is present in an amount of about 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95 or 99 wt %, including increments therebetween.

The second phase may be present the composition in an amount of about 1 wt % to about 99 wt % by the weight ratio. This includes an amount of about 10 wt % to about 99 wt %, about 20 wt % to about 99 wt %, about 30 wt % to about 99 wt %, about 40 wt % to about 99 wt %, about 50 wt % to about 99 wt %, about 60 wt % to about 99 wt %, or about 70 wt % to about 99 wt % by the weight ratio. In some embodiments, the second phase is present in an amount of about 1 wt % to about 89 wt % by weight of the composite. This includes an amount of about 10 wt % to about 89 wt %, about 20 wt % to about 89 wt %, about 30 wt % to about 89 wt %, about 40 wt % to about 89 wt %, about 50 wt % to about 89 wt %, or about 60 wt % to about 89 wt % by the weight ratio. In some embodiments, the second phase is present in an amount of about 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95 or 99 wt %, including increments therebetween.

The third phase may be present the composition in an amount of about 1 wt % to about 99 wt % by the weight ratio. This includes an amount of about 10 wt % to about 99 wt %, about 20 wt % to about 99 wt %, about 30 wt % to about 99 wt %, about 40 wt % to about 99 wt %, about 50 wt % to about 99 wt %, about 60 wt % to about 99 wt %, or about 70 wt % to about 99 wt % by the weight ratio. In some embodiments, the third phase is present in an amount of about 1 wt % to about 89 wt % by weight of the composite. This includes an amount of about 10 wt % to about 89 wt %, about 20 wt % to about 89 wt %, about 30 wt % to about 89 wt %, about 40 wt % to about 89 wt %, about 50 wt % to about 89 wt %, or about 60 wt % to about 89 wt % by the weight ratio. In some embodiments, the third phase is present in an amount of about 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95 or 99 wt %, including increments therebetween.

In some embodiments, the first phase is present from 0.01 to 99.9 wt %, the second phase is present from 0.01 to 99.9 wt %, and the third phase is present from 0.01 to 99.9 wt %, provided the total of the phases does not exceed 100%. This includes where the first phase is present from 10 to 50 wt %, the second phase is present from 10 to 50 wt %, and the third phase is present from 0.01 to 80.0 wt %; where the first phase is present from 20 to 50 wt %, the second phase is present from 20 to 50 wt %, and the third phase is present from 0.01 to 60 wt %; where the first phase is present from 30 to 50 wt %, the second phase is present from 30 to 50 wt %, and the third phase is present from 0.01 to 40 wt %; and where the first phase is present from 35 to 50 wt %, the second phase is present from 35 to 50 wt %, and the third phase is present from 0.01 to 30 wt %; and, again, provided that the total of all three phases is 100 wt %.

As noted above, any of the integrated $Na_xMO_2$ materials having a first phase, a second phase that is different from the first phase, and a third phase that is different from the first and second phases may be used as a cathode active material. In such embodiments, the $Na_xMO_2$ may include a surface coating. The surface coating may include an oxide, a fluoride, a metal phosphate, a metal oxyfluoride, or a conductive carbon coating. Illustrative surface coatings may include, but are not limited to, $MgO$, $Al_2O_3$, $ZrO_2$, $MnO_2$, $CeO_2$, $TiO_2$, $ZnO$, $SiO_2$, $SnO_2$, $Cr_2O_3$, $AlF_3$, $CaF_2$, $CeF_3$, $ZrF$, $ZrF_2$, $ZrF_3$, $ZrF_4$ $LaF_3$, $SrF_2$, $AlPO_4$, $YPO_4$, $Li_3PO_4$, $FePO_4$, $Mg_3(PO_4)_2$, $Zn_3(PO_4)_2$, $Ca_3(PO_4)_2$, $Co_3(PO_4)_2$, $Ni_3(PO_4)_2$, iron oxyfluoride, cerium oxyfluoride, magnesium oxyfluoride, zirconium oxyfluoride, aluminum oxyfluoride, vanadium oxyfluoride, silicon oxyfluoride, bismuth oxyfluoride, or a conductive carbon material, or a combination of any two or more thereof. The coating may be applied or deposited on the cathode active material using chemical vapor deposition (CVD), physical vapor deposition (PVD), magnetic sputtering, or pyrolysis.

In some embodiments, the integrated materials may further include a dopant. Dopants include other cation (i.e. metal elements) and anion (i.e. metal, halogen, or other anionic materials) dopants. In some embodiments, the dopant is a metal fluoride. In some embodiments, after doping, the integrated $Na_xMO_2$ has a general formula of $Na_xM_yM'_zO_{2-\delta}F_\delta$. In the $Na_xM_yM'_zO_{2-\delta}F_\delta$, the M is as above, y is greater than 0 and less than or equal to 0.9, z is greater than 0 and less than or equal to 0.1, and δ is greater than 0 and less than or equal to 0.2. Illustrative M' may include, but are not limited to, Li, Mg, Al, Ca, Sc, Zn, Y, Zr, Nb, Mo, Ru, Ag, Ba, Sb, and combinations of any two or more thereof.

In another aspect, processes are provided for preparing the integrated $Na_xMO_2$ materials above and having an integrated structure of at least a first phase, a second phase that is different from the first phase, and a third phase that is different from the first and second phases, with each phase being independently selected from Pm or On, where n is an integer. In some embodiments, Pm is P1, P2, or P3 and On is O1, O2, or O3. The processes may include a solvothermal reaction or a co-precipitation reaction between metal salts in the presence of a precipitation agent in a specific solvent, followed by first and second (or more) calcination steps followed by a step of temperature quenching of the reaction. As used herein, a solvothermal reaction is a method of producing chemical compounds under autoclave conditions in a, typically, non-aqueous solvent. As used herein, a co-precipitation reaction is one in which precipitates of otherwise soluble materials are formed and collected using a co-precipitation reagent.

In the processes, the metals are as defined above, and the metal salts include, but are not limited to, metal sulfates, metal sulfites, metal chlorates, metal nitrates, metal acetates, metal phosphates, metal citrates and metal carbonates. In some embodiments, the precipitation agent includes, but is not limited to, one or more of oxalic acid, sodium hydroxide, ammonium hydroxide, sodium carbonate, ammonium carbonate, and ammonium hydrogen carbonate. In some embodiments, the solvent could be at least one or more of ethanol, deionized water, acetone, acetonitrile, 1-butanol, 2-butanol, diethylene glycol, ethylene glycol, toluene, 1-propanol, 2-propanol, hexane, cyclohexane, diethyl ether, acetic acid, chlorobenzene, 1,2-dimethoxy-ethane, dimethyl-formamide, dimethyl sulfoxide, tetrahydrofuran, oleic acid, or oleic amide.

The solvothermal reaction may be performed for a time period of about 1 to about 40 hours. This includes a time period of about 2 to about 40 hours, about 3 to about 40 hours, about 4 to about 40 hours, about 5 to about 40 hours, about 6 to about 40 hours, about 7 to about 40 hours, about 8 to about 40 hours, about 9 to about 40 hours, about 10 to about 40 hours, about 11 to about 40 hours, about 12 to about 40 hours, about 15 to about 40 hours, about 20 to about 40 hours, about 25 to about 40 hours, about 30 to about 40 hours, or about 35 to about 20 hours. In some embodiments, the solvothermal reaction is performed for a time period of about 1 to about 15 hours. This includes a time period of about 2 to about 15 hours, about 3 to about 15 hours, about 4 to about 15 hours, about 5 to about 15 hours, about 6 to about 15 hours, about 7 to about 15 hours, about 8 to about 15 hours, about 9 to about 15 hours, or about 10 to about 15 hours.

The solvothermal reaction may be performed at a temperature of about 100 to about 240° C. This includes a temperature range of about 110 to about 240° C., about 120 to about 240° C., about 130 to about 240° C., about 140 to about 240° C., about 150 to about 240° C., about 160 to about 240° C., about 170 to about 240° C., about 180 to about 240° C., about 190 to about 240° C., about 200 to about 240° C., about 210 to about 240° C., about 220 to about 240° C., or about 230 to about 240° C. In some embodiments, the solvothermal reaction may be performed at a temperature of about 140 to about 200° C. This includes a temperature range of about 150 to about 200° C., about 160 to about 200° C., about 170 to about 200° C., about 180 to about 200° C., or about 190 to about 200° C.

As noted above, the method also includes a two-step calcination process of a calcination step at a lower (i.e. first) temperature followed by calcination at a higher (i.e. second) temperature. The calcination process is then followed by temperature quenching.

The first calcination process may be performed at a temperature of about 400 to about 600° C. This includes from about 410 to about 600° C., about 420 to about 600° C., about 430 to about 600° C., about 440 to about 600° C., about 450 to about 600° C., about 460 to about 600° C., about 470 to about 600° C., about 480 to about 600° C., about 490 to about 600° C., about 500 to about 600° C., about 520 to about 600° C., about 540 to about 600° C., about 560 to about 600° C., or about 580 to about 600° C. In some embodiments, the solvothermal reaction may be performed at a temperature of about 400 to about 500° C. This includes a temperature range of about 410 to about 500° C., about 420 to about 500° C., about 430 to about 500° C., about 440 to about 500° C., about 450 to about 500° C., about 460 to about 500° C., about 470 to about 500° C., about 480 to about 500° C., or about 490 to about 500° C.

The first calcination may be performed for a time period of about 1 to about 20 hours. This includes a time period of about 2 to about 20 hours, about 3 to about 20 hours, about 4 to about 20 hours, about 5 to about 20 hours, about 6 to about 20 hours, about 7 to about 20 hours, about 8 to about 20 hours, about 9 to about 20 hours, about 10 to about 20 hours, about 11 to about 20 hours, about 12 to about 20 hours, or about 15 to about 20 hours. In some embodiments, the first calcination is performed for a time period of about 1 to about 10 hours. This includes a time period of about 2 to about 10 hours, about 3 to about 10 hours, about 4 to about 10 hours, about 5 to about 10 hours, about 6 to about 10 hours, about 7 to about 10 hours, about 8 to about 10 hours, or about 9 to about 10 hours.

The second calcination step may then be performed at a second calcination temperature, $T_c$, of about 600 to about 1000° C. This includes a temperature from about 410 to about 1000° C., about 620 to about 1000° C., about 630 to about 1000° C., about 640 to about 1000° C., about 650 to about 1000° C., about 660 to about 1000° C., about 670 to about 1000° C., about 680 to about 1000° C., about 690 to about 1000° C., about 700 to about 1000° C., about 750 to about 1000° C., about 800 to about 1000° C., about 850 to about 1000° C., about 900 to about 1000° C., or about 950 to about 1000° C. In some embodiments, the second calcination process may be performed at a temperature of about 800 to about 1000° C. This includes a temperature range of about 810 to about 1000° C., about 820 to about 1000° C., about 830 to about 1000° C., about 840 to about 1000° C., about 850 to about 1000° C., about 860 to about 1000° C., about 870 to about 1000° C., about 880 to about 1000° C., about 890 to about 1000° C., about 900 to about 1000° C., or about 950 to about 1000° C.

The calcination step may be performed for a time period of about 1 to about 30 hours. This includes a time period of about 2 to about 30 hours, about 3 to about 30 hours, about 4 to about 30 hours, about 5 to about 30 hours, about 6 to about 30 hours, about 7 to about 30 hours, about 8 to about 30 hours, about 9 to about 30 hours, about 10 to about 30 hours, about 11 to about 30 hours, about 12 to about 30 hours, about 15 to about 30 hours, about 20 to about 30 hours, or about 25 to about 30 hours. In some embodiments, the second calcination is performed for a time period of about 1 to about 15 hours. This includes a time period of about 2 to about 15 hours, about 3 to about 15 hours, about 4 to about 15 hours, about 5 to about 15 hours, about 6 to about 15 hours, about 7 to about 15 hours, about 8 to about 15 hours, about 9 to about 15 hours, about 10 to about 15 hours, about 11 to about 15 hours, about 12 to about 15 hours, about 13 to about 15 hours, or about 14 to about 15 hours.

The two-step calcination process may perform at a specific heating and cooling rate as well, for example from about 0.5 to about 30° C. $min^{-1}$. This includes a heating or cooling rate of about 1 to about 30° C. $min^{-1}$, about 2 to about 30° C. $min^{-1}$, about 3 to about 30° C. $min^{-1}$, about 4 to about 30° C. $min^{-1}$, about 5 to about 30° C. $min^{-1}$, about 6 to about 30° C. $min^{-1}$, about 7 to about 30° C. $min^{-1}$, about 8 to about 30° C. $min^{-1}$, about 9 to about 30° C. $min^{-1}$, about 10 to about 30° C. $min^{-1}$, about 11 to about 30° C. $min^{-1}$, about 12 to about 30° C. $min^{-1}$, about 15 to about 30° C. $min^{-1}$, about 20 to about 30° C. $min^{-1}$, or about 25 to about 30° C. $min^{-1}$.

The quench step may be performed by rapidly cooling the calcined sample from the $T_c$ to lower temperature. In some embodiments, the rapid cooling may be to a temperature of from room temperature to about 300° C. Thus, where $T_c$ is up to about 1000° C., the quench may, in some instances, cool the sample from about 1000° C. to 300° C., or lower. The lower temperature may be from about room temperature (or even lower) to about 300° C., from about room temperature (or lower) to about 200° C., from about room temperature (or lower) to about 100° C., or from about room temperature (or lower) to about 50° C. In some embodiments, the lower temperature is exposure of the sample to room temperature.

In another aspect, a cathode for an electrochemical cell is provided, the cathode including any of the integrated $Na_xMO_2$ materials described above, along with at least one or more of a current collector, a conductive carbon material, and a binder.

Illustrative current collectors may be prepared from a wide variety of materials. For example, illustrative current collectors include, but are not limited to, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen. In some embodiments, the $Na_xMO_2$ materials disclosed herein and one or more of a conductive carbon material and a binder are contacted with the current collector by casting, pressing, or rolling the mixture thereto.

Illustrative conductive carbon materials include, but are not limited to, microporous carbon, mesoporous carbon, mesoporous microbeads, graphite, expandable graphite, carbon black, or carbon nanotubes, or any combination thereof. Commercial examples of carbon black include, but are not limited to, Super P, Black Pearls® 2000, Denka Black, Vulcan XC72R, and Ketjenblack®, or a mixture of any two or more thereof.

When used, the binder may be present in the electrode in an amount of from about 0.1 wt. % to about 99 wt. %. In some embodiments, the binder is present in the electrode in an amount of from about 5 wt. % to about 20 wt. %. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, sodium alginate, polythiophene, polyacetylene, poly(9,9-dioctylfluorene-co-fluorenone), poly(9,9-dioctylfluorene-co-fluorenone-co-methylbenzoic ester), a copolymer of any two or more such polymers, and a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), and a copolymer of any two or more such conductive polymers.

In another aspect, disclosed herein are electrochemical devices including a cathode that includes any of the integrated $Na_xMO_2$ materials having an integrated structure of at least a first phase, a second phase that is different from the first phase, and a third phase that is different from the first and second phases, with each phase being independently selected from Pm or On, where n is an integer from 1 to 100. In some embodiments, Pm is P1, P2, or P3 and On is O1, O2, or O3. In some embodiments, the electrochemical devices are sodium-ion batteries. In further embodiments, the electrochemical devices are room-temperature sodium-ion batteries. In some embodiments, the electrochemical devices are primary batteries, secondary batteries, or capacitors. In some embodiments, the electrochemical devices are secondary sodium-ion batteries.

The electrochemical device may further include an anode, a separator, and/or an electrolyte. The anode may include an anode active material, and one or more of a current collector, a conductive carbon material, and a binder as those materials are as described above. The active anode material may include phosphorus-carbon composite, antimony-carbon composite, tin-carbon composite, hard carbon, germanium-carbon composite, transition metal oxides, transition metal sulfides, or a combination of any two or more thereof.

Illustrative separators include, but are not limited to, polyethylene, polypropylene, and polyvinylidene fluoride (PVDF).

In some embodiments, the electrolyte includes a sodium salt and a solvent. The sodium salt may be any sodium salt that will support the conductivity of an electrochemical cell. Non-limiting examples of such salts include $NaClO_4$, $NaPF_6$, $NaAsF_6$, $NaBF_4$, $NaCF_3SO_3$, $NaN(SO_2CF_3)$, or a combination of any two or more thereof. The salt may be present in the electrolyte at a concentration of about 0.01 M to about 3.0 M. This includes a concentration of about 0.01 M to about 2.5 M, about 0.01 M to about 2.0 M, about 0.01 M to about 2.0 M, about 0.01 M to about 1.5 M, about 0.01 M to about 1.0 M, about 0.01 M to about 0.5 M, or about 0.01 M to about 0.1 M. In some embodiments, the salt is present in the electrolyte at a concentration of about 0.5 M to about 3.0 M. This includes a concentration of about 0.5 M to about 2.0 M, about 0.5 M to about 1.5 M, about 1.0 M to about 3.0 M, or about 1.0 M to about 2.0 M. In some embodiments, the salt is present in the electrolyte at a concentration of about 0.01, 0.05, 0.1, 0.5, 1.0, 1.5, 2.0, 2.5, or 3.0 M, including increments therein.

The solvent for the electrolyte may be a non-aqueous solvent. Illustrative non-aqueous solvents include carbonates, ethers, fluorinated materials, and the like. Illustrative solvents may include, but are not limited to ethylene carbonate, propylene carbonate, diethyl carbonate, dimethyl carbonate, ethyl methyl carbonate, tetraethylene glycol, dimethylsulfolane, 1,2-dimethoxyethane, and 1,2-diethoxyethane.

In some embodiments, the electrolyte further includes an electrolyte additive. Illustrative electrolyte additives include, but are not limited to, vinylene carbonate, fluorinated ethylene carbonated, cyclic disulfonic ester methylene methanedisulfonate (MMDS), lithium bis(oxalate)borate, ethylene sulfite, ethylene sulfate, trimethylene sulfite, 1,3-butylene glycol sulfite, tris(trimethylsilyl) phosphate (TMSP) and tris(trimethylsilyl)borate (TMSB). The electrolyte additive may be present in the electrolyte in an amount of about 1% to about 10% by weight or by volume. This includes an amount of about 1% to about 8% by weight or by volume, about 1% to about 6% by weight or by volume, about 1% to about 4% by weight or by volume, or about 1% to about 3% by weight or by volume. In some embodiments, the electrolyte additive is present in the electrolyte in an amount of about 1, 2, 3, 4, 5, 6, 7, 8, 0.9, or 10% by weight or by volume.

The present invention, thus generally described, will be understood more readily by reference to the following examples, which are provided by way of illustration and are not intended to be limiting of the present invention.

EXAMPLES

Example 1

Preparation of the precursor for the synthesis of $Na_xNi_{1/3}Co_{1/3}Mn_{1/3}O_2$ electroactive materials. The precursor for the synthesis of layered $Na_xNi_{1/3}Co_{1/3}Mn_{1/3}O_2$(NCM) cathode materials was prepared by a solvothermal method. In a typical synthesis, stoichiometric amounts (with 5% excess sodium) of metal acetates, $NaCH_3COO \cdot 3H_2O$ (0.00525 mol), $Mn(CH_3COO)_2 \cdot 4H_2O$ (0.00166 mol), $Ni(CH_3COO)_2 \cdot 4H_2O$ (0.00166 mol), and $Co(CH_3COO)_2 \cdot 4H_2O$ (0.00166 mol) were dissolved in 50 mL of ethanol. Oxalic acid ($H_2C_2O_4$; 0.0123 mol) was used as a precipitating agent and was also dissolved in ethanol. The molar ratio of oxalic acid to metal ions is 1.2 with the content of the Na source. An ethanol solution of oxalic acid (1M) was added in a dropwise manner to the mixed metal-oxalate solution under magnetic stirring. After stirring for 60 min, the solution mixture was transferred and sealed in a Teflon-lined autoclave heated to 180° C. for 12 h, and then cooled to room temperature. The obtained pink precipitate was collected by solvent evaporation at 80° C. The pink precipitate contains a mixture of oxalates such as $MnC_2O_4$, $NiC_2O_4$, $CoC_2O_4$, and $Na_2C_2O_4$.

Example 2

The first calcination on the material of Example 1. The pink material obtained in Example 1 was then subjected to calcining at 500° C. for 6 h at a heating rate of 3° C. $min^{-1}$, followed by cooling to room temperature under natural conditions (i.e. allowing the heat to dissipate from the furnace prior to removal of the sample from the furnace). The color of the material had changed from pink to black.

Example 3

Synchrotron in-situ high energy X-ray diffraction (HEXRD) patterns of the black material of Example 2, during the heating and cooling processes. In-situ HEXRD was utilized to monitor the structural evolution and phase transition during the formation of the material in Example 2. FIG. 1A shows the in-situ HEXRD patterns of the oxalate precursor from 27° C. to 1000° C. during the heating process. It can be clearly seen that there are very few phase transformations from 27° C. to about 600° C. However, starting at about 655° C., the in-situ HEXRD peaks of the O3 and O1 phases gradually emerge. When the temperature was further increased to 1000° C., an obvious triple phase co-existence (P2/O3/O1) can be seen. FIG. 1B illustrates the in-situ HEXRD patterns of the first calcined product from 1000° C. to 30° C. during the natural cooling process. During this cooling the in-situ HEXRD peaks of O3 and O1 phase are observed to gradually disappear. At about 364° C., most of diffraction peaks belonging to the O3 and O1 phases have disappeared, and the in-situ HEXRD peaks of the P2 and P3 phases dominate the spectra. The observed phase transformation during the heating and cooling process indicated that NCM materials with different phase structures can be obtained through controlling the calcination conditions.

Example 4

Figure 2:
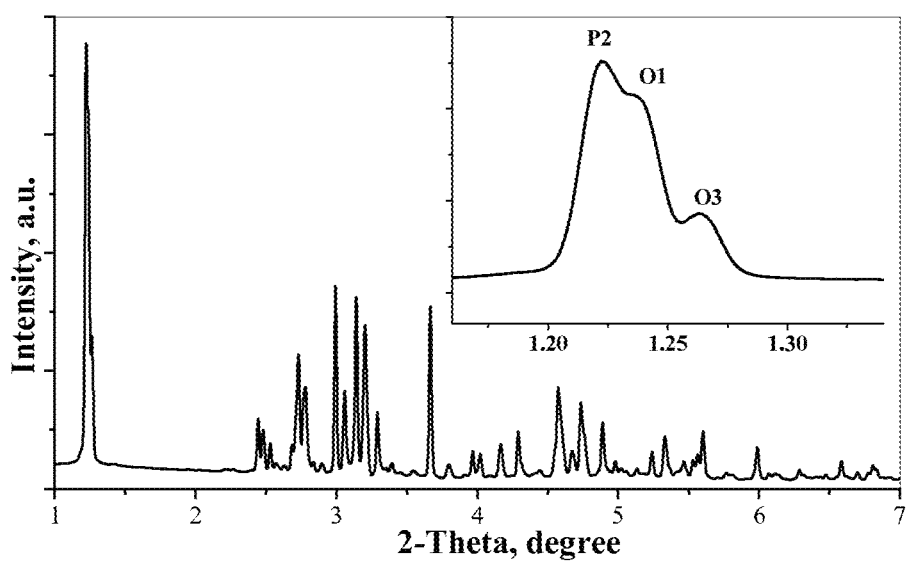
FIG. 2 depicts representative high energy X-ray diffraction patterns of $Na_xNi_{1/3}CO_{1/3}Mn_{1/3}O_2$ material with ternary phase structure integration, according to the examples.

Phase structure and morphology characterization of $Na_xNi_{1/3}Co_{1/3}Mn_{1/3}O_2$ material with ternary phase structure integration. Based on the in-situ HEXRD results, $Na_x Ni_{1/3}Co_{1/3}Mn_{1/3}O_2$ having a ternary phase structure integration was synthesized by calcining of the first calcined material of Example 2 at 850° C. for 12 h followed by rapid temperature quenched to 300° C. in air. FIG. 2 shows the HEXRD pattern of the $Na_xNi_{1/3}Co_{1/3}Mn_{1/3}O_2$ material, which shows clear ternary phase (P2, O1, and O3) structure integration. This material is also referred to herein as NCM-Q. Compared to the P2/O3 binary-phase integration reported by Lee et al. (*Adv. Energy Mater.* 2014, 4, 1400458), the weight ratio of O1 phase in the $Na_xNi_{1/3}Co_{1/3}Mn_{1/3}O_2$ material has been dramatically increased, which is very important.

Example 5

Figure 3:
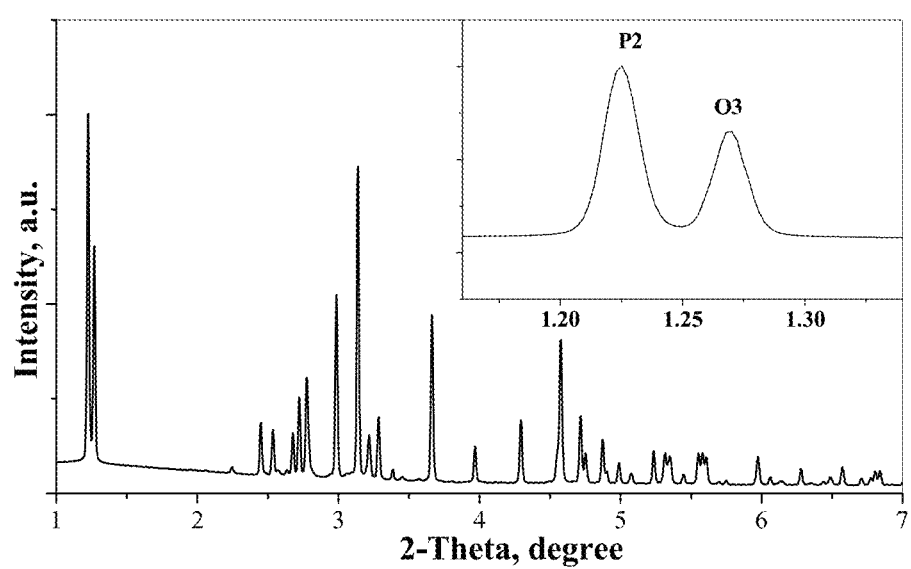
FIG. 3 depicts representative high energy X-ray diffraction patterns of $Na_xNi_{1/3}Co_{1/3}Mn_{1/3}O_2$ material with binary structure integration, according to the examples.

Phase structure of $Na_xNi_{1/3}Co_{1/3}Mn_{1/3}O_2$ material with binary phase structure integration. To determine the $Na_x Ni_{1/3}Co_{1/3}Mn_{1/3}O_2$ material with binary phase structure integration, the first calcined precursor of Example 2 was calcined at 850° C. for 12 h and then cooled to room temperature at a rate of 1° C. $min^{-1}$. FIG. 3 shows the HEXRD pattern of the product. Compared to that of Example 5, most of the diffraction peaks for O1 are absent, indicating a two phase structure integration (P2+O3).

Example 6

Figure 4:
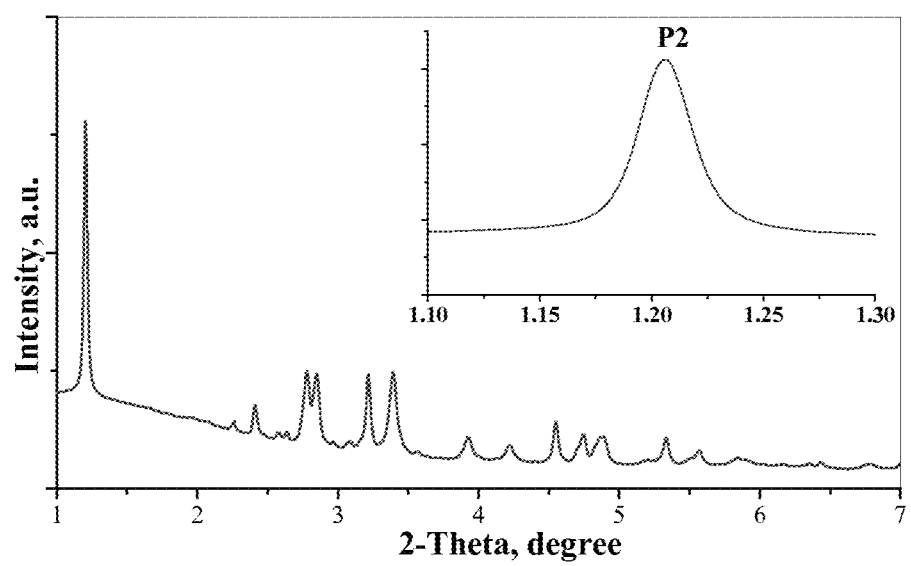
FIG. 4 depicts representative high energy X-ray diffraction patterns of $Na_xNi_{1/3}CO_{1/3}Mn_{1/3}O_2$ material with only P phase, according to the examples.

Phase structure of $Na_xNi_{1/3}Co_{1/3}Mn_{1/3}O_2$ material with mainly P2 phase structure integration. To determine the $Na_xNi_{1/3}Co_{1/3}Mn_{1/3}O_2$ material with a single P phase structure integration, the first calcined precursor of Example 2 was calcined at 600° C. for 10 h and then cooled to room temperature at a cooling rate of 1° C. $min^{-1}$. FIG. 4 shows the HEXRD pattern of the product. Compared to that of Examples 4 and 5, most of the diffraction peaks for O1 and O3 are absent, indicating a single phase structure.

Example 7

Illustrative Batteries using various $Na_xNi_{1/3}Co_{1/3}Mn_{1/3}O_2$ materials.

Separately, 70 wt. % of $Na_xNi_{1/3}Co_{1/3}Mn_{1/3}O_2$ materials of Examples 4 (also referred to as "NCM-Q"), 5 (also referred to as "NCM-WQ"), or 6 (also referred to as "NCM-600") were mixed with 20 wt. % Super-P and 10 wt. % PVDF (formed from 8 wt. % PVDF in NMP (N-methylpyrrolidone)) binder. The well-mixed slurry was then cast onto a sheet of aluminum foil by a doctor blade on an automatic film coater. The film was dried in a vacuum oven at 80° C. for 12 h and then transferred to a glove box filled with argon, before being punched out as circular, 14 mm in diameter, disks. The electrolyte for the cells was 1.0 M $NaPF_6$ salt in propylene carbonate (PC) with 2 vol. % of fluorinated ethylene carbonate ("FEC") as an additive. A CR2032 coin cell was then assembled using the prepared electrode disk, the prepared electrolyte, a sodium foil counter electrode, and a glass fiber separator. Cell assembly was conducted in a glove box filled with argon.

Example 8

Figure 5:
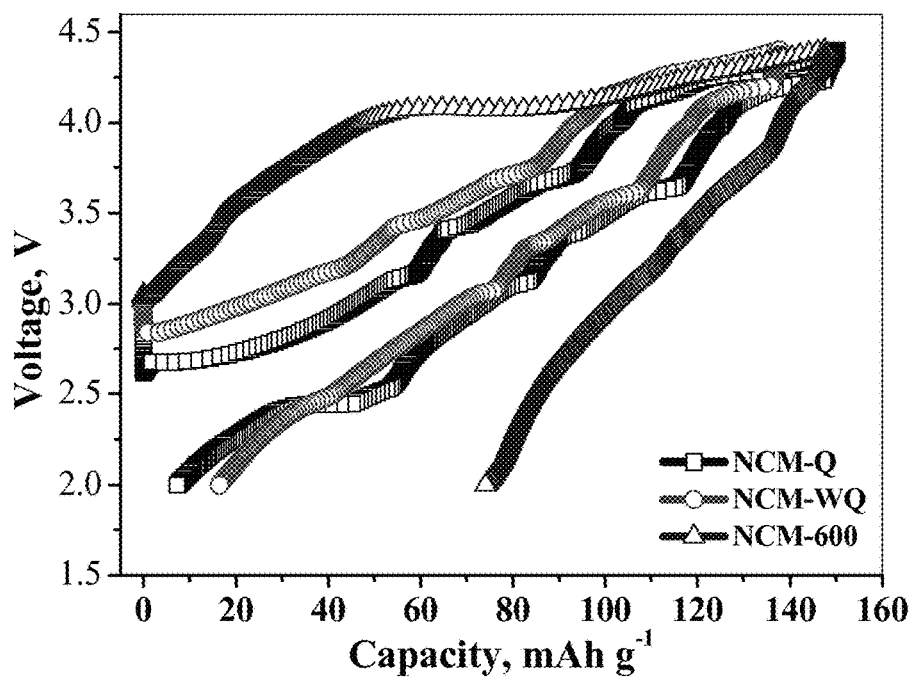
FIG. 5 depicts representative $1^{st}$ charge/discharge curves of various $Na/Na_xNi_{1/3}Co_{1/3}Mn_{1/3}O_2$ cells in 1 M $NaPF_6$/PC with 2 vol. % fluorinated ethylene carbonate additive within 2.0-4.4 V at 15 mA $g^{-1}$, according to the examples.

Electrochemical properties of the cells from Example 7. The assembled coin cells were subject to charge/discharge cycles within a relatively wide voltage range of 2.0 V to 4.4 V. FIG. 5 compares the $1^{st}$ charge/discharge voltage profiles of the NCM cathode materials at a charge/discharge rate of 0.1 C (1 C=150 mA $g^{-1}$). As shown, the $1^{st}$ charge/discharge curve of NCM-600 is much smoother than that of either the NCM-Q or NCM-WQ. The profiles for the NCM-Q or NCM-WQ are consistent with those as previously reported by Hasa et al. *Advanced Energy Materials,* 2014, 4, 1400083.

Figure 6:
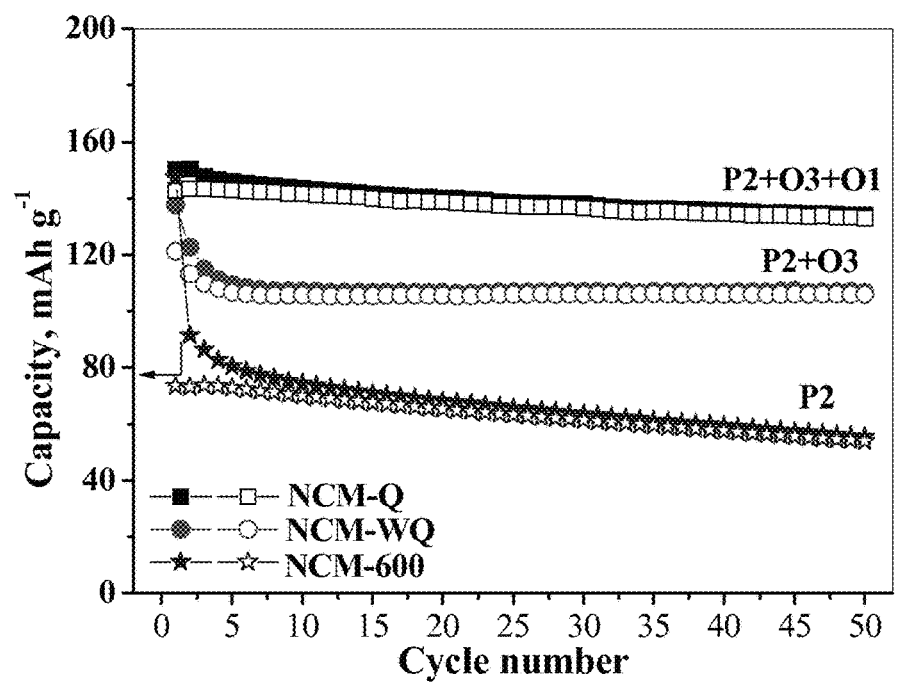
FIG. 6 depicts representative cycle performance of various $Na/Na_xNi_{1/3}Co_{1/3}Mn_{1/3}O_2$ cells in 1 M $NaPF_6$/PC with 2 vol. % fluorinated ethylene carbonate additive within 2.0-4.4 V at 15 mA $g^{-1}$, according to the examples.
Figure 7:
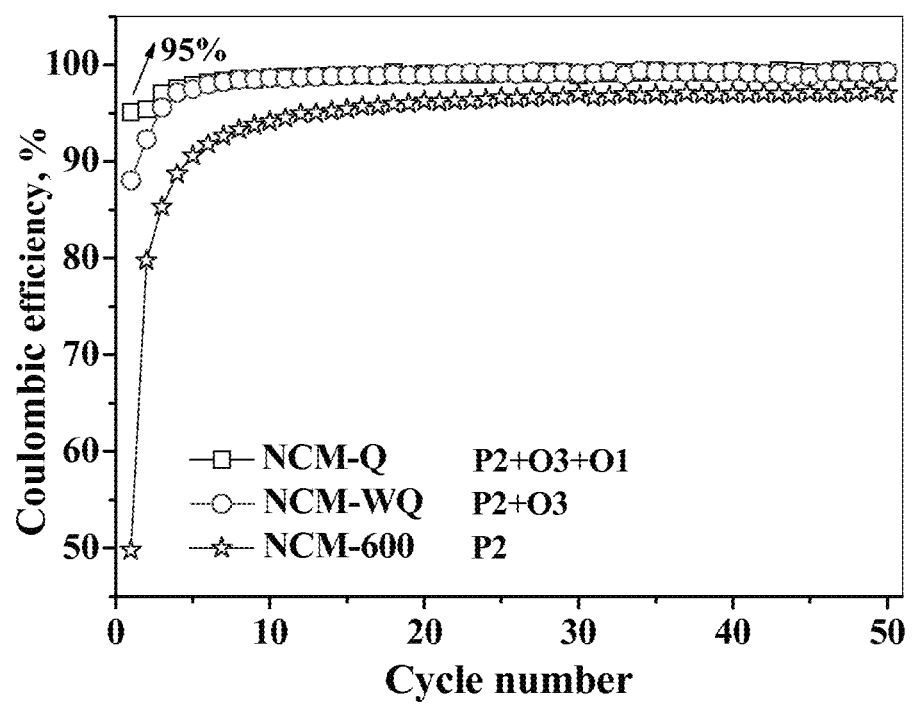
FIG. 7 depicts representative coulombic efficiency of various $Na/Na_xNi_{1/3}CO_{1/3}Mn_{1/3}O_2$ cells in 1 M $NaPF_6$/PC with 2 vol. % fluorinated ethylene carbonate additive within 2.0-4.4 V at 15 mA $g^{-1}$, according to the examples.
Figure 8:
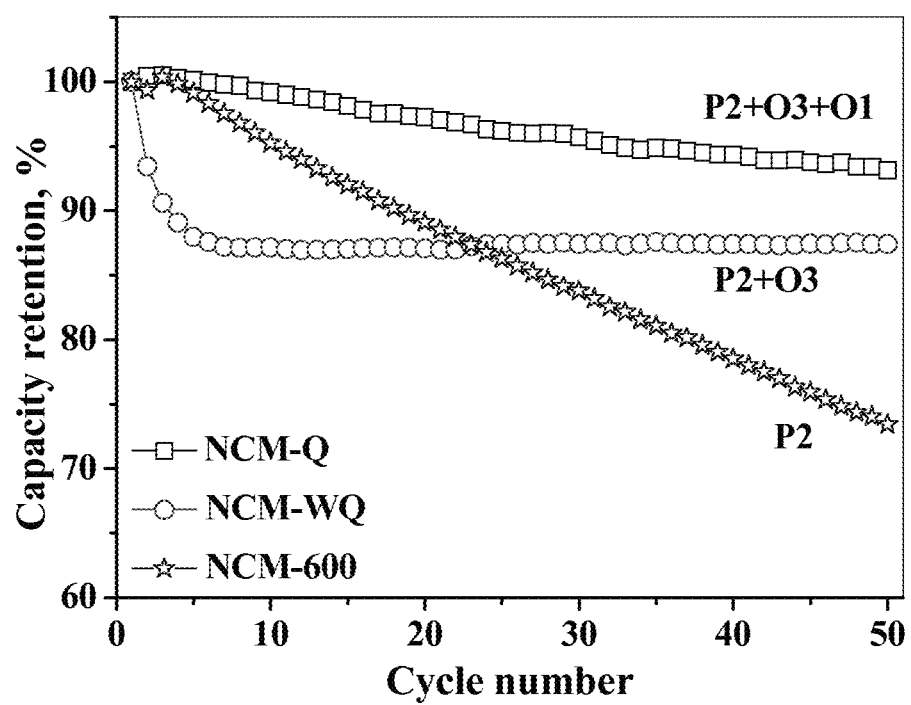
FIG. 8 depicts representative capacity retention of various $Na/Na_xNi_{1/3}Co_{1/3}Mn_{1/3}O_2$ cells in 1 M $NaPF_6$/PC with 2 vol. % fluorinated ethylene carbonate additive within 2.0-4.4 V at 15 mA $g^{-1}$, according to the examples.

The initial charge specific capacity of NCM-600 was measured to be 147.5 mAh $g^{-1}$. However, the initial discharge capacity was only 73.4 mAh $g^{-1}$, indicating a large irreversible capacity loss and a low initial coulombic efficiency (49.8%). This may be due to the structure instability of P-type material at deep charge state. The $1^{st}$ charge/discharge capacities of the NCM-WQ were measured to be 127.6 and 121.2 $mAh^{-1}$, respectively, leading to a coulombic efficiency of about 88%. The NCM-Q appears to deliver the highest $1^{st}$ charge and discharge capacity, which were measured to be 150.2 mAh $g^{-1}$ and 142.8 mAh $g^{-1}$, respectively. The $1^{st}$ irreversible capacity loss was only 7.4 mAh g$^{-1}$, implying a very high initial coulombic efficiency of up to about 95%. FIG. 6 further compares the cycle stability and coulombic efficiency upon continuous cycling within 2.0 V to 4.4 V at 0.1 C. It is observed that the NCM-Q also delivers the highest reversible capacity after 50 cycles. The reversible capacities of NCM-Q, NCM-WQ and NCM-600 at the 50$^{th}$ cycle were 133 mAh g$^{-1}$, 106.7 mAh g$^{-1}$, and 53.9 mAh g$^{-1}$, respectively. As shown in FIG. 7, unlike the high coulombic efficiency of NCM-Q and NCM-WQ (around 100% from the 2$^{nd}$ cycle), the NCM-600 shows coulombic efficiency lower than 100% in the first 20 cycles, suggesting a lower sodiation/de-sodiation reversibility. Therefore, it's not surprising that the capacity retention within 50 cycles is in the order of NCM-Q (93.2%)>NCM-WQ (87.4%)>NCM-600 (73.4%) (see FIG. 8).

Figure 9:
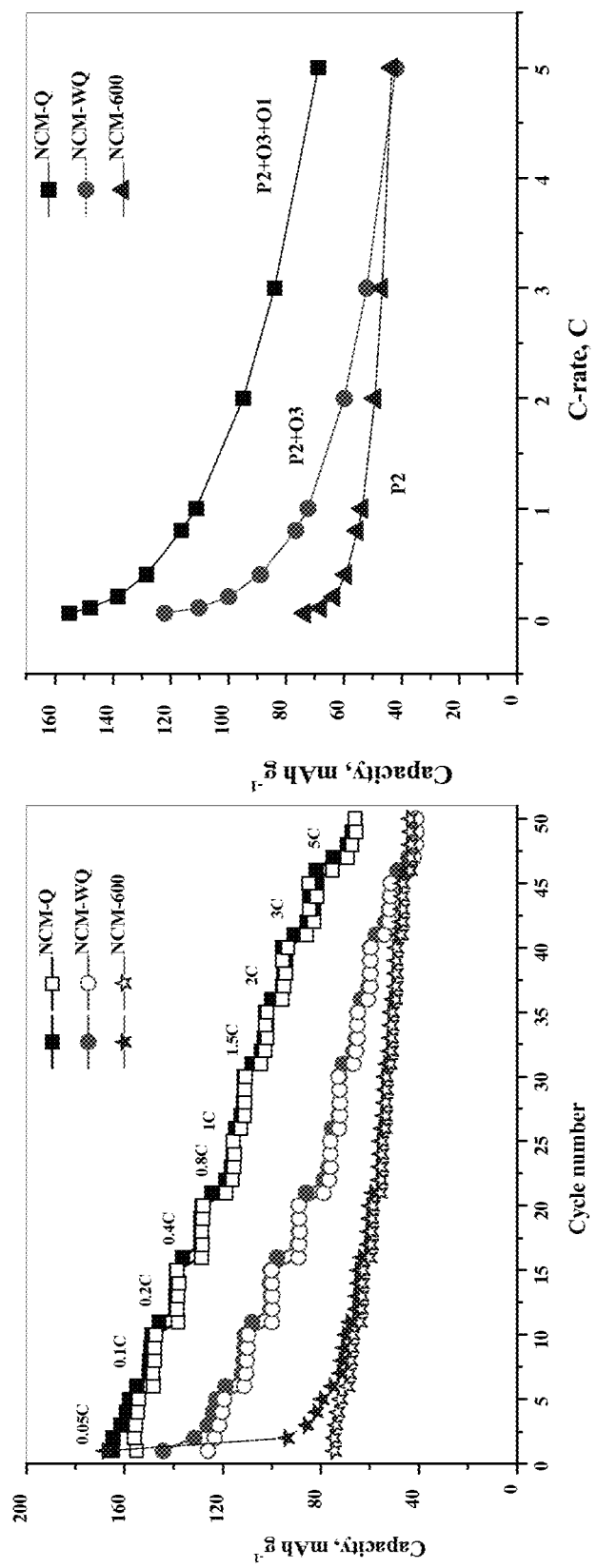
FIG. 9 depicts representative rate capability of various $Na/Na_xNi_{1/3}Co_{1/3}Mn_{1/3}O_2$ cells in 1 M $NaPF_6$/PC with 2 vol. % fluorinated ethylene carbonate additive within 2.0 V to 4.4 V, according to the examples.
Figure 10:
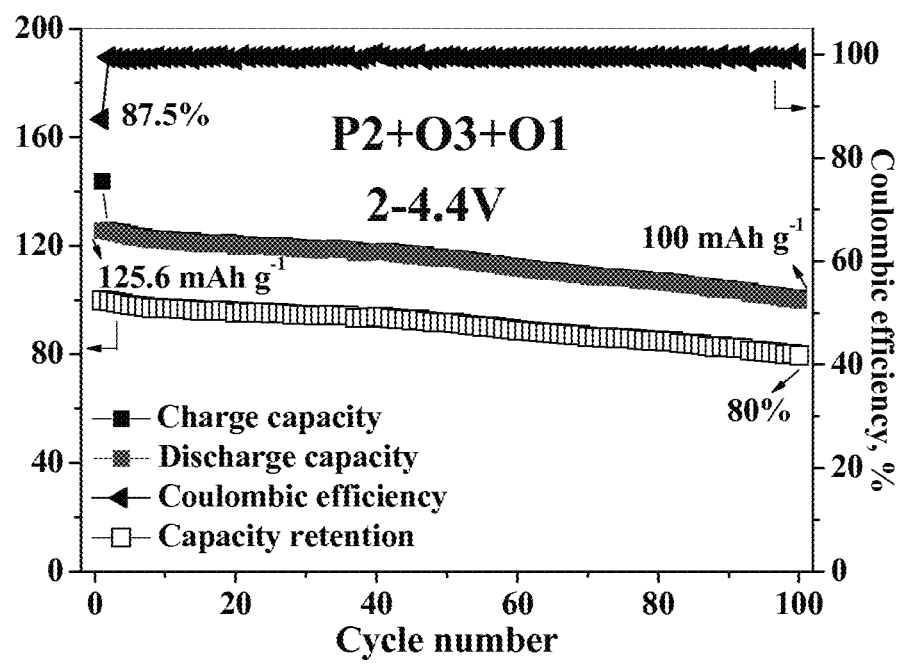
FIG. 10 depicts representative cycle performance of various $Na/Na_xNi_{1/3}CO_{1/3}Mn_{1/3}O_2$ cells in 1 M $NaPF_6$/PC with 2 vol. % fluorinated ethylene carbonate additive within 2.0 V to 4.4 V at 75 mA $g^{-1}$, according to the examples.

FIG. 9 further demonstrates the advantage of the triple-phase integration on the rate capability. As shown, NCM-Q delivered the highest average reversible capacities at different charge/discharge C-rates. Their average reversible capacities were calculated and compared in FIG. 9B. The NCM-Q delivered a high reversible capacity of 155.1 mAh g$^{-1}$ at 0.05 C, and a capacity of 68.8 mAh g$^{-1}$ even at the high rate of 5 C. As comparison, both of the reversible capacities for NCM-WQ and NCM-600 at 5 C are only 40 mAh g$^{-1}$. FIG. 10 depicts the cycle stability of NCM-Q at 0.5 C, which could deliver a 1$^{st}$ discharge capacity of 125.6 mAh g$^{-1}$ with an initial coulombic efficiency of 87.5%, and still maintain 100 mAh g$^{-1}$ after 100 cycles, leading to a high capacity retention of 80%. The above results indicate that the NCM-Q with triple-phase integration (P2/O3/O1) demonstrates higher reversible capacity, higher coulombic efficiency and better cycle stability, as well as better rate capability, than either NCM-WQ with binary-phase integration (P2/O3) or NCM-600 with only P phase dominated.

Example 9

Figure 11:
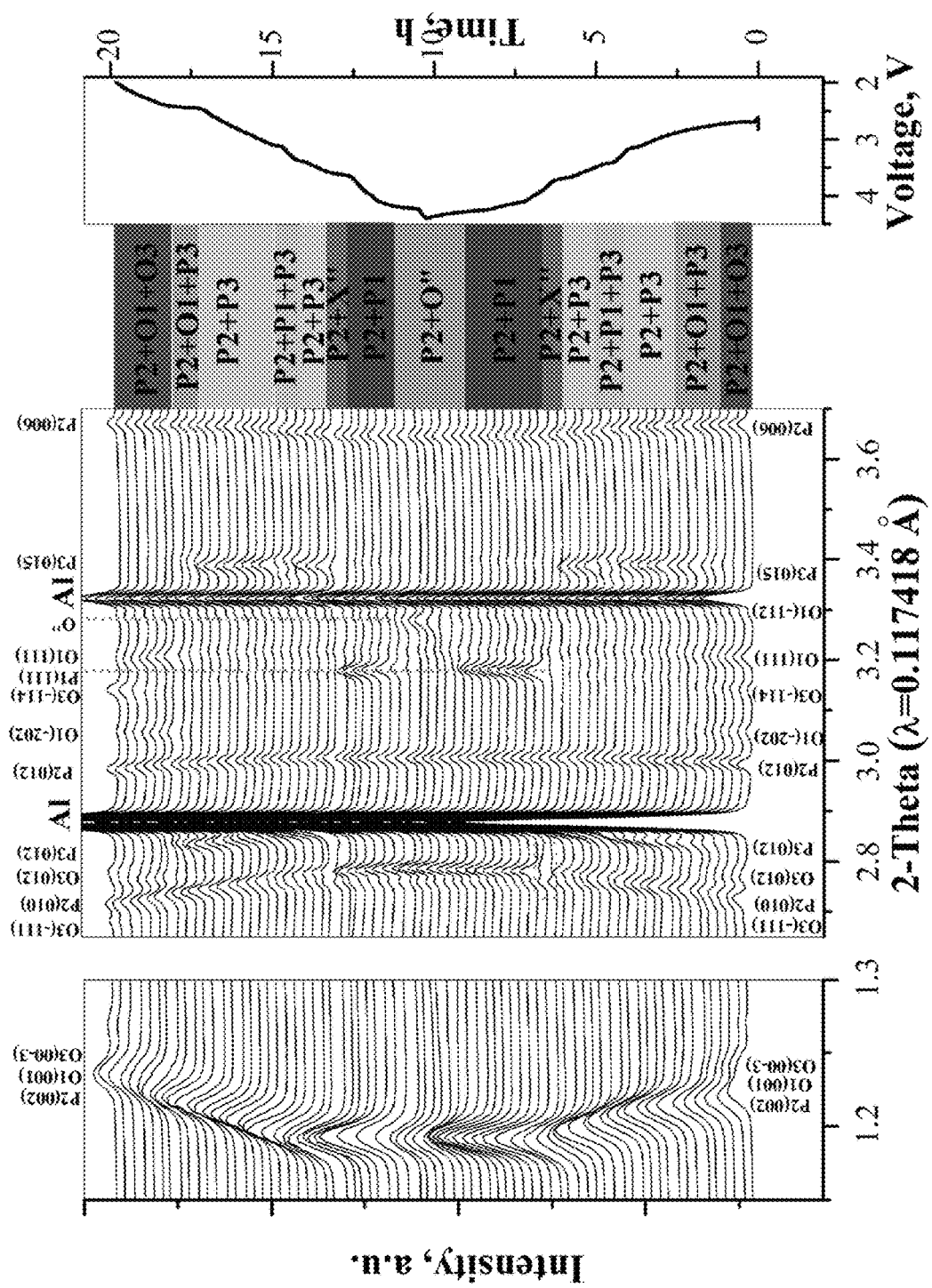
FIG. 11 depicts representative synchrotron in-situ high energy X-ray diffraction patterns of $Na/Na_xNi_{1/3}Co_{1/3}Mn_{1/3}O_2$ cell of FIG. 5 collected during charge/discharged within 2.0 V to 4.4 V at 15 mA $g^{-1}$ in 1 M $NaPF_6$/PC with 2 vol. % fluorinated ethylene carbonate additive, according to the examples.

In-situ HEXRD patterns of the material of Example 5 collected during the 1$^{st}$ charge/discharge process. FIG. 11 shows the in-situ HEXRD patterns (in the patterns, the phase evolution process and the charge/discharge curves have been synchronized) of the NCM-Q cathode material during the first charge/discharge cycle within 2.0 V to 4.4 V at 0.1 C along with the in-situ charge/discharge curve. Two strong diffraction peaks centered at 2.88° and 3.32° are assigned to the signals of the aluminum current collector. The pristine NCM-Q electrode has all the diffraction peaks of the NCM-Q powder sample. Previous in-situ XRD study on the individual O3 and P2 phase during cycling has indicated that O3 phase undergoes multi-phase transformation, while the P2 phase generally has only peaks shifts at low voltage region. Therefore, upon sodium insertion/extraction, both the peaks shifts and transformation can be observed, which should be related to its P and O phase structural integration for NCM-Q. By comparison of the whole set of in-situ HEXRD patterns during the charging process, it can be seen that the major reflections corresponding to the P2 phase are well maintained even when charged to 4.4 V, and only peaks shifts can be observed, indicating that there are no significant phase transformation for P2 domains. In other words, the previously reported P2-O2 transition for P2 type cathode materials during high voltage cycling is inhibited in the case of NCM-Q. It can be seen that the (002) and (006) peaks both shift toward the low angle during the charging process, in agreement with an expansion of the c lattice parameter, resulting from the increased electrostatic repulsion between successive oxygen layers during the extraction of sodium ions. On the other hand, the (010) and (012) peaks moved toward the high angle throughout the whole charge process, thereby suggesting a shrinkage in the a lattice parameter upon charge, as the a lattice parameter corresponds to $T_M$-$T_M$ distances. Oxidation of TMs upon charging leads to slightly shorter distances between TMs. The (001) peaks of P2 shifted towards high angle and the (011) peaks moved to low angle during the discharge process, corresponding to sodium insertion process. Thus, it has been proved by synchrotron in-situ HEXRD that the sodiation/de-sodiation process is highly reversible for the P2 domains in the NCM-Q, even within a wide voltage range. This is significantly different from the individual P2 Na$_x$(Fe$_{1/2}$Mn$_{1/2}$)O$_2$ cathode, which involved a P2-OP4 transformation when charge/discharged from 1.5 V to 4.2 V, and which presented a rapid capacity fading (*Chem. Mater.* 2014, 26(2): 1260-1269.).

For the O3 and O1 domains of the NCM-Q, transformation from O3 to O1, P3, P1+P3 solid solution and P3 was observed in the voltage region of 2 V to 3.75 V, which is the same as the earlier report on the O3 Na$_x$Ni$_{1/3}$Co$_{1/3}$Mn$_{1/3}$O$_2$ cathode. Upon the charge process, the HEXRD peaks of O3 and O1 phases gradually disappeared accompanied by the formation of P3 phase (P3 (012) and P3 (015)). Along with further de-sodiation, a clear P1+P3 solid solution was observed within 3.20 V to 3.50 V, which was evidenced by the split and merger of the diffraction peaks at 3.4°. This phenomenon is exactly the same as the O3 Na$_x$Ni$_{1/3}$Co$_{1/3}$Mn$_{1/3}$O$_2$ cathode. When the cell was further charged, the diffraction peaks of P3 phase gradually disappeared. After that, a strong diffraction peak indexed as P1 (111) can be seen at 3.17° when the O3 cathode was charged to higher voltage (>4.2 V), indicating the formation of the P1 phase. Upon further charging to 4.4 V, a new diffraction peak at 3.28° emerged, indicating a formation of a new phase structure (O"). We are currently not able to assign this structure, but it may be different to P1, P2, P3, O1, and O3. During the discharge process, the O3 and O1 domains exhibit a complete reverse phase transformation to the charge process (O" to P1, X", P1+P3, P3, O1 and O3+O1). Therefore, the O3 and O1 phase in the NCM-Q by triple-phase integration also illustrated very high sodiation/de-sodiation reversibility. This is also different from individual O3 Na$_{1-x}$Ni$_{0.5}$Mn$_{0.5}$O$_2$ that reported by Komaba and co-workers, which showed a rapid capacity fading in 20 cycles within 2.2 V to 4.5 V (see Komaba et al. *Inorg Chem*, 2012, 51, 6211-6220).

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A cathode active material comprising integrated $Na_xMO_2$ having at least a first phase, a second phase different from the first phase, and a third phase that is different from the first and second phases, wherein each phase is independently selected from Pm or On, where m and n are individually an integer, M is a transition metal or a mixture of transition metals, and x is greater than 0 and less than or equal to 1, wherein the cathode active material further comprises a surface coating.

2. The cathode active material of claim 1, wherein m is 1, 2, 3, 4, 5, 6, 7, or 8; and n is 1, 2, 3, 4, 5, 6, 7, or 8.

3. The cathode active material of claim 1, wherein M is selected from the group consisting of Fe, Co, Ni, Mn, Cr, V, Cu, Ti, and a combination of any two or more thereof.

4. The cathode active material of claim 1 further comprising a dopant such that an overall formula of the doped cathode active material is $Na_xM_yM'_zO_{2-\delta}F_\delta$, wherein M' is Li, Mg, Al, Ca, Sc, Zn, Y, Zr, Nb, Mo, Ru, Ag, Ba, Sb, or a combination of any two or more thereof; y is greater than 0 and less than or equal to 0.9; z is greater than 0 and less than or equal to 0.1; and $\delta$ is greater than 0 and less than or equal to 0.2.

5. The cathode active material of claim 1, wherein the M is a mixture of Co, Ni, and Mn.

6. The cathode active material of claim 1 having the formula $Na_xNi\alpha Co\beta Mn_\gamma O_2$, and $\alpha$ is greater than 0 and less than or equal to 1, $\beta$ is greater than 0 and less than or equal to 1, and $\gamma$ is greater than 0 and less than or equal to 1, where the total of $\alpha, \beta$ and $\gamma$ is equal to 1.

7. The cathode active material of claim 1, wherein the first phase is P2, the second phase is O1, and the third phase is O3.

8. The cathode active material of claim 1, further comprising a current collector, a conductive agent, a binder, or any combination thereof.

9. The cathode active material of claim 1, wherein the surface coating comprises a metal oxide, a metal fluoride, a metal phosphate, a conductive carbon coating, a metal oxyfluoride, or a combination of any two or more thereof.

10. The cathode active material of claim 9, wherein the surface coating comprises a metal oxide selected from the group consisting of MgO, $Al_2O_3$, $ZrO_2$, $MnO_2$, $CeO_2$, $TiO_2$, ZnO, $SiO_2$, $SnO_2$, $Cr_2O_3$, and a combination of any two or more thereof.

11. The cathode active material of claim 9, wherein the surface coating comprises a metal fluoride selected from the group consisting of $AlF_3$, $CaF_2$, $CeF_3$, ZrF, $ZrF_2$, $ZrF_3$, $ZrF_4$, $LaF_3$, $SrF_2$, and a combination of any two or more thereof.

12. The cathode active material of claim 9, wherein the surface coating comprises a metal phosphate selected from the group consisting of $AlPO_4$, $YPO_4$, $Li_3PO_4$, $FePO_4$, $Mg_3(PO_4)_2$, $Zn_3(PO_4)_2$, $Ca_3(PO_4)_2$, $Co_3(PO_4)_2$, $Ni_3(PO_4)_2$, and a combination of any two or more thereof.

13. The cathode active material of claim 9, where the surface coating comprises a metal oxyfluoride selected from the group consisting of iron oxyfluoride, cerium oxyfluoride, magnesium oxyfluoride, zirconium oxyfluoride, aluminum oxyfluoride, vanadium oxyfluoride, silicon oxyfluoride, bismuth oxyfluoride, and a combination of any two or more thereof.

* * * * *